United States Patent [19]
Walsh

[11] Patent Number: 4,716,482
[45] Date of Patent: Dec. 29, 1987

[54] HEAD ACTUATOR LIMIT STOP ASSEMBLY FOR A DISK MEMORY DRIVE

[75] Inventor: Edward Walsh, Boise, Iowa
[73] Assignee: Hewlett-Packard Company, Palo Alto, Calif.
[21] Appl. No.: 829,686
[22] Filed: Feb. 14, 1986
[51] Int. Cl.⁴ .............................................. G11B 21/08
[52] U.S. Cl. ................................................. 360/106
[58] Field of Search .......................................... 360/106
[56] References Cited
U.S. PATENT DOCUMENTS

| 4,101,802 | 8/1978 | Ho et al. | 360/106 |
| 4,346,416 | 8/1982 | Riggle et al. | 360/106 |

Primary Examiner—Robert S. Tupper
Attorney, Agent, or Firm—William J. Bethurum

[57] ABSTRACT

An impact limit stop or crash stop control in a disc drive for setting and maintaining the limits of movement and the stopping distance of a linear or rotary actuator member which supports and moves the transducer heads for bidirectional movement between radial limits with respect to the memory discs. In one of its aspects, this crash stop control provides a low sensitivity, high precision, limit stop adjustment which sets the limits of movement of the actuator member, and which, in another of its aspects, provides a non-linear deceleration characteristic, with some frictional damping, for the actuator member in its limits of movement.

6 Claims, 16 Drawing Figures

U.S. Patent   Dec. 29, 1987   Sheet 5 of 6   4,716,482
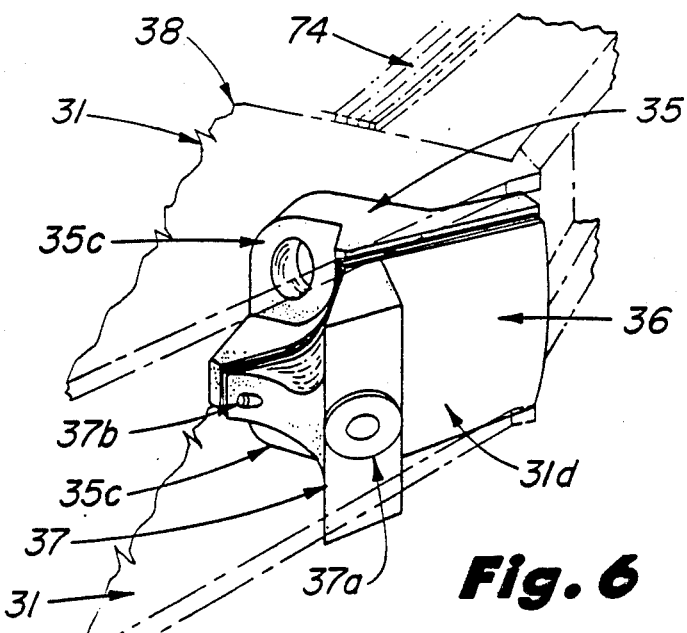
Fig. 6
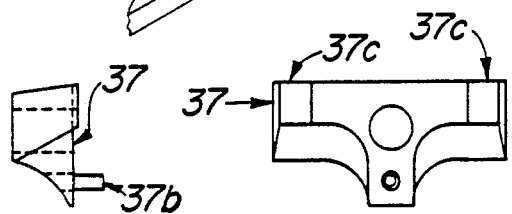
Fig. 7   Fig. 8
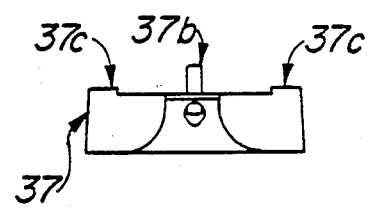
Fig. 9
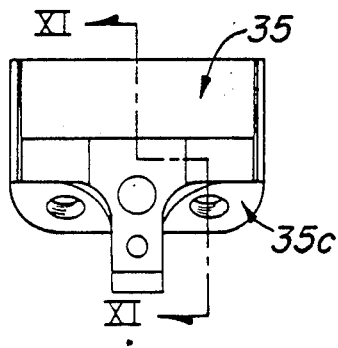
Fig. 10   Fig. 11   Fig. 12

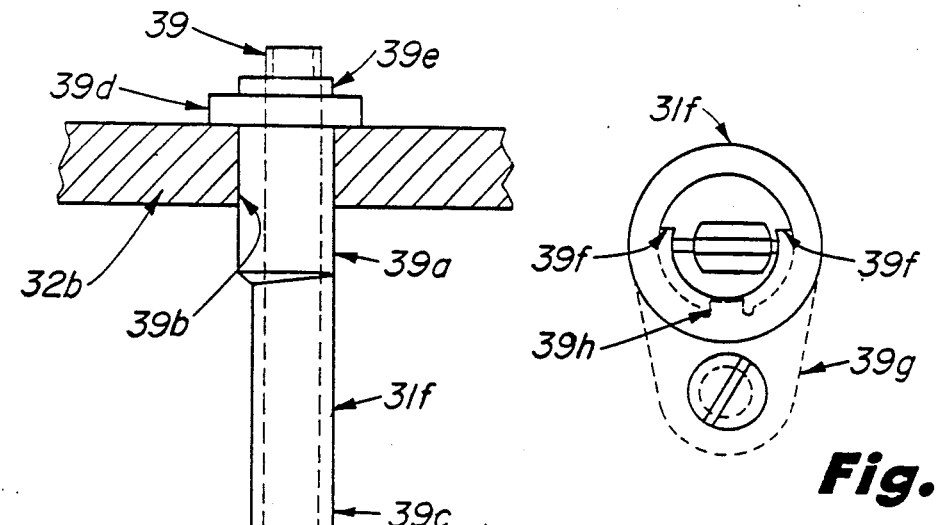
Fig. 14
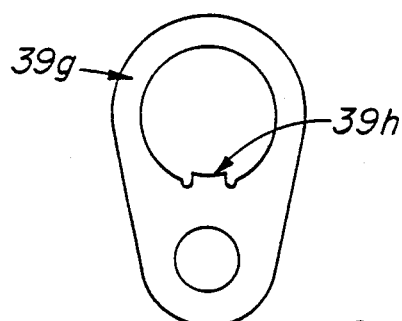
Fig. 15
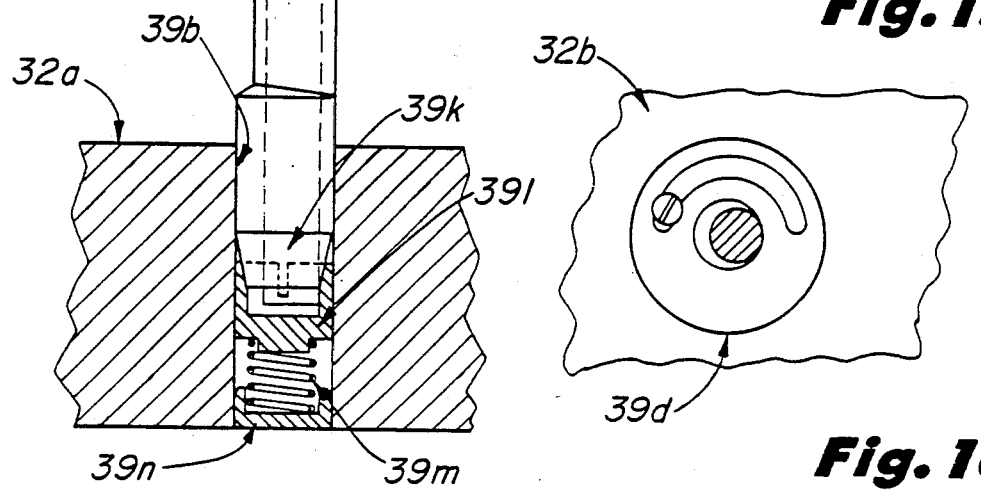
Fig. 13
Fig. 16

HEAD ACTUATOR LIMIT STOP ASSEMBLY FOR A DISK MEMORY DRIVE

TECHNICAL FIELD

This invention relates generally to disk memory drives and more particularly to a disc memory drive having improved control of transducer head movement in inner and outer radial limits of movement with respect to a memory disk.

BACKGROUND ART

Computer disc drives are dynamic information storage units having high bit densities. They are very high precision units requiring close dimensional tolerances in manufacturing and in use and are complex and delicate mechanically. They generally comprise rotatable memory discs, transducer heads and a linear or pivotally mounted, magnetically driven actuator arm assembly which supports the transducer heads and provides bidirectional movement with respect to the discs between inner and outer radial limits.

Limit stops are provided to control the limits of movement of the actuator arm assembly. By this expedient, the inner and outer radial limits of travel of the transducer heads with respect to the discs are established. The limits are required for safely restricting the travel in case of drive electronic failure and to establish known locations on the disc to provide information in recovery from a failure. In view of the high bit densities on the discs, it is important that the radial distance over the disc required for decelerating and stopping the heads be minimized. Equally importantly, the established radial limits must be precise as to location, precise as to the maintenance of that location, precise as to the maintenance of the stopping distance and must be accomplished in a manner that does not induce vibration or "ringing" of the delicate transducer heads. The ringing is due to the abrupt pickup of the crash stop mass (stationary) by the actuator assembly mass (moving).

The actuator arm assemblies are made of light weight material and the moving parts of the magnetic driver coupled to the actuator arm assembly are kept as light as possible, with as much stiffness as possible. This results in as high a natural frequency of vibration as possible. The impact of the actuator arm assembly with the limit stops may have high energy at high frequencies. This makes the actuator arm/transducer assembly vibrate a great deal in spite of the stiffness and frequency. Above a certain level, this vibration can cause damage to the delicate head assemblies, each of which comprises a transducer head mounted to a flexure assembly. The flexure comprises a load finger functioning as a cantilever spring, and a gimble mount for the transducer head. The transducer has two degrees of angular freedom, one in pitch and one in roll in its gimble mount.

Efforts to eliminate this problem in the past have resulted in the use of softer materials in the limit stop. These materials still have a mostly linear deflection or displacement rate. Normally the use of softer materials just increases the required stopping distance. This increase in radial stopping distance reduces the usable surface of the disc for information recording. In addition, such material as elastomers which have been used tend to vary considerably in stiffness as a function of temperature. When the design is made soft enough to function correctly at low environmental operating temperatures, by the time high environmental operating temperatures have been reached, along with additional temperature rises due to self heating of the drive system, the elastomeric material has been further reduced in stiffness. This not only increases the stopping distance it also changes the radial position in which the movement of the transducer heads ceases.

In some prior art arrangements employing a pivoted or rotary actuator arm, adjustment of the limit stop position has required the adjustment of limit stop members from one of the sides of the actuator housing in which the actuator arm assembly is pivoted. Usually these adjustments are quite sensitive requiring repeated attempts to achieve a precise limit stop setting. Additionally this increases the manufacturing costs since fabrication now requires off axis machining, that is drilling, reaming, boring, etc., in a direction other than a direction substantially paralleling the axis about which the actuator arm assembly is pivoted.

Other prior art designs have provided limit stop adjustments which are accessable from the top of the actuator housing. Some of these have a sliding part in which the slightest sliding movement to ajust the stop results in a significant change in the limit stop setting because of the small dimensions of track spacing. Such an arrangement while presenting a problem in achieving a desired limit stop position or setting, frequently also presents a problem in maintaining a fixed limit stop setting because of the high clamping forces which are required to secure the adjustable stop.

DISCLOSURE OF THE INVENTION

This invention provides improvements over prior art such as discussed above, in the provision of an adjustable limit stop arrangement which provides precision in the limit stop setting and nonlinear, frictionally damped, deceleration of the actuator arm assembly in its movement into the limit stop position.

The invention is described in its application to a rotary actuator type of disc drive which represents a presently preferred embodiment. The invention, however, is equally applicable to the linear actuator of a linear type of disc drive.

Precise limit stop adjustment is achieved in the provision of an eccentric limit stop which is rotatably mounted in a structure which movably supports the actuator arm assembly. Each limit stop has a stiff spring characteristic and is disposed with its eccentric portion in the path of movement of the actuator arm assembly in each of its extremes of movement. Precise adjustments of limit stop positions are provided with this arrangement since the 180 degree rotation of the limit stop member translates into a very small radial displacement at the eccentric portion of the limit stop member. Now a precise limit stop setting is achieved with relative ease. This rotatably mounted eccentric limit stop is easily fabricated and machining operations in the actuator housing for its rotatable mounting in a rotary actuator disc drive are all in positions paralleling the pivot axis of the actuator arm assembly, thus jigging for machine operations in cross axes is not required.

Stopping in a minimal distance in each limit of movement is achieved in the use of an impact or crash pad having a nonlinear spring characteristic. This pad is mounted on the actuator arm assembly and moves with it to impact the eccentric portion of the limit stop rod. Specifically this impact pad utilizes a cantilever spring assembly which has a face portion which impacts the eccentric limit stop. The cantilever spring is a stacked assembly of individual leaf springs of beryllium copper, for example, which are transversely bowed. One end of this stacked assembly is clamped in a clamp on a support structure which is mounted on the actuator arm assembly, or is an integral part of the actuator arm assembly. The stacked, bowed springs project from this clamp. The central area of the free ends of these springs are spaced a small distance from the support structure. As the actuator arm assembly moves into a limit of movement, the leaf spring assembly impacts the eccentric portion of the limit stop in a position on the spring assembly displaced from the cantilever spring clamp. First, the cantilever spring assembly bends and the transverse bow at the unclamped end of the springs begins to flatten out. The actuator arm gives up energy in work done bending the spring, in overcoming friction between leaves of the spring and in initiating acceleration of the eccentric limit stop. The free end of the cantilever spring assembly progressively contacts the support, increasing the spring rate with the flattening of the free end of the cantilever spring against the support. Now continued movement of the actuator arm results in reverse bending of the cantilever spring assembly between the bearing point at the free end of the cantilever spring assembly and the end which is clamped. Thus nonlinearity is provided in the three phases of cantilever spring deflection described, with some overlapping of the phases of deflection. The time during the early stages of the impact, and its progressive nature gives a chance for the limit stop (also a spring) to start accelerating, thus minimizing the abrupt pickup of its mass by the moving mass. The frequency content of the impact is reduced, minimizing high frequency ringing. Additionally, there is friction between the individual springs of the cantilever spring assembly. This results in increasing friction damping losses for a given coefficient of sliding friction as a function of the increasing normal component of force applied to the cantilever spring assembly in its three phases of deflection.

It is evident that this arrangement provides an improvement over the prior art as discussed above. The limit stop is easily and precisely set by the rotatable eccentric limit stop. Nonlinear stiffness is provided by the unique impact pad in the provision of increasing spring rate as a function of spring deflection. Shock is reduced by this nonlinearity in the progressive application of force to the eccentric limit stop. The arrangement is not sensitive to environmental temperatures because of the use of materials which for all practical purposes are unresponsive to temperature excursions within the environmental temperature range.

BRIEF DESCRIPTION OF THE DRAWINGS

FIG. 6 is a perspective view of the impact pad assembly viewed from the direction indicated by the arrow A in FIG. 3.

FIGS. 7, 8 and 9 are differing projections of the clamp used in the impact pad assembly.

FIG. 10 is a plan view of the impact pad support.

FIG. 11 is a cross sectional view of the impact pad support taken on the line XI—XI of FIG. 10.

FIG. 12 is a plan view of a leaf spring used in the impact pad assembly.

FIG. 13 is an enlarged elevational view of the rotatable eccentric limit stop member.

FIG. 14 is an enlarged top view of the limit stop of FIG. 13.

FIG. 15 is a clamp used to secure the rotational movement of the limit stop of FIG. 13 in any angular position within the limits of angular movement; and FIG. 16 illustrates a modified clamping arrangement for the limit stop.

BEST MODE FOR CARRYING OUT THE INVENTION

Figure 1:
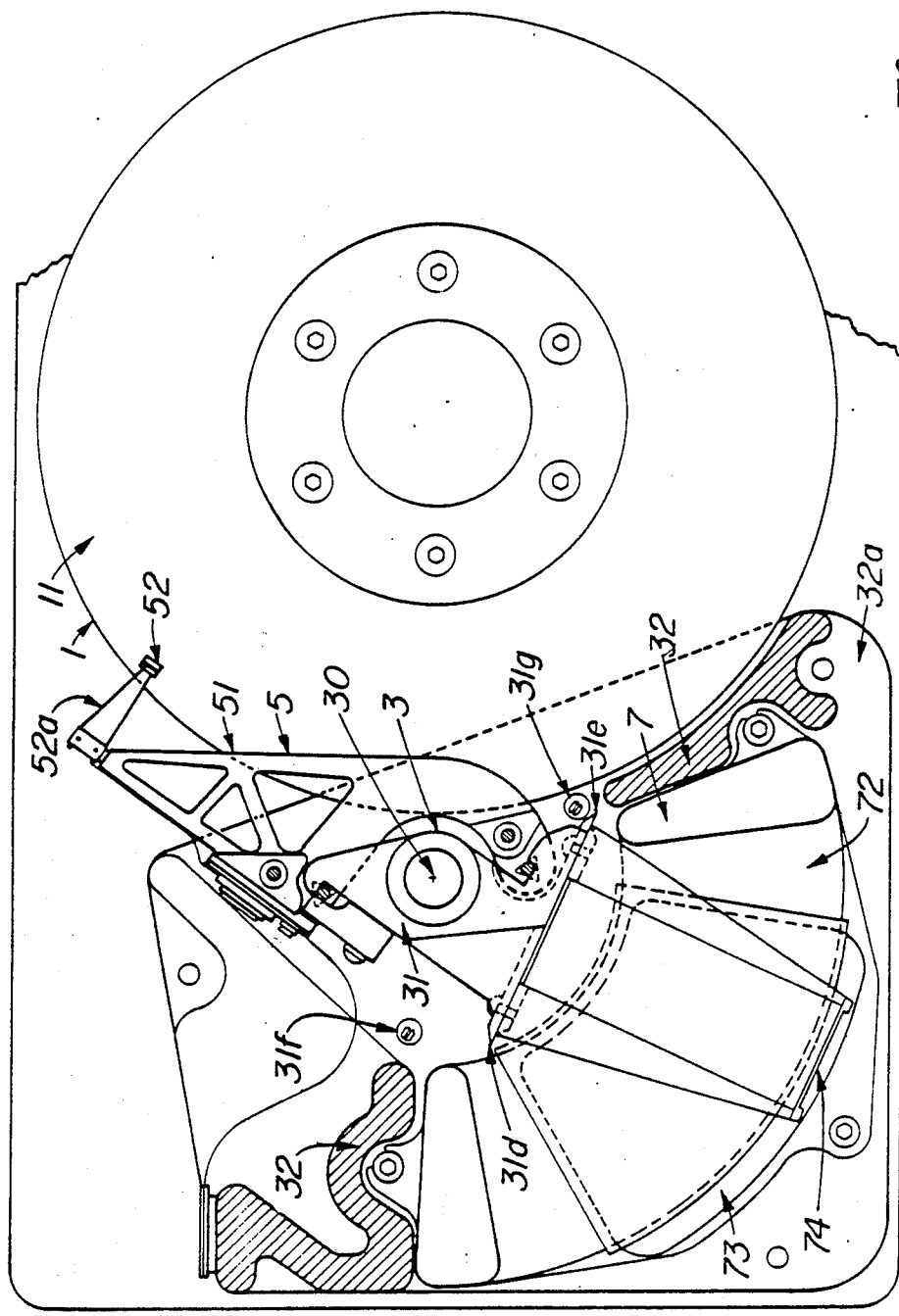
FIG. 1 is a plan view, partly in section, of a rotary disc memory drive assembly embodying the principles of this invention.
Figure 2:
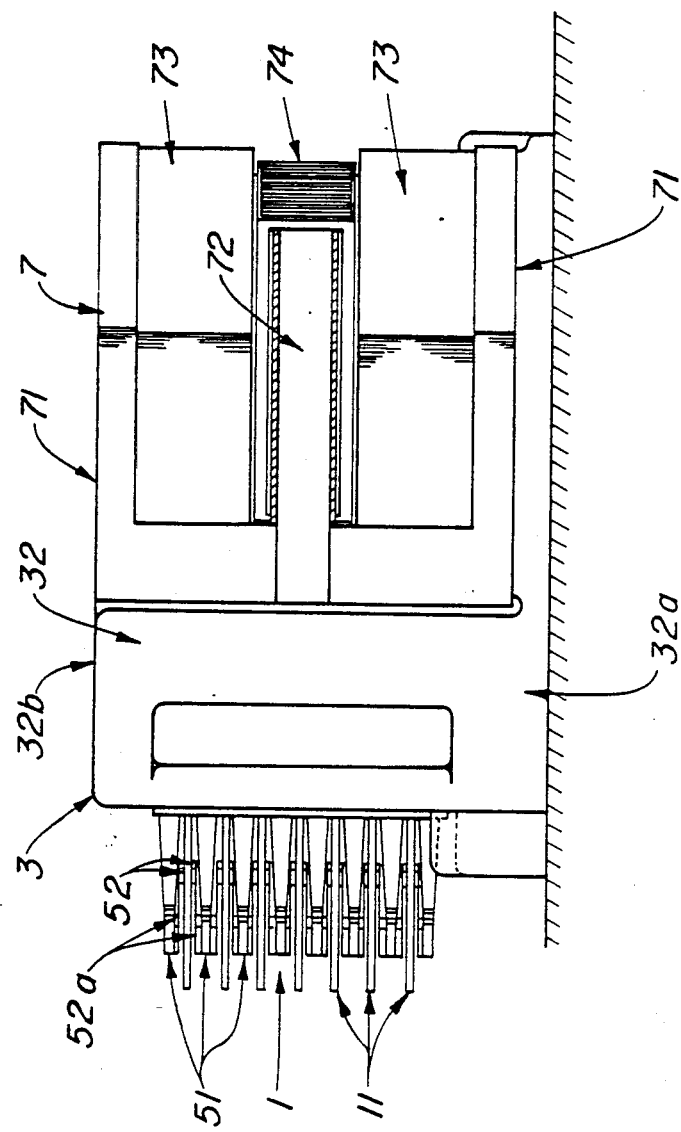
FIG. 2 is a side view partly in section of the disc drive assembly of FIG. 1.

FIGS. 1 through 16 illustrate the details of a presently preferred embodiment of this invention as a part of a rotary disc memory drive. FIGS. 1 and 2 are respectively plan and side views of a rotary disc memory drive. FIG. 1 is shown fragmentarily in section to better illustrate certain details of this invention. This disc memory drive comprises a disc memory assembly 1 adapted to be driven by a motor (not shown), an actuator structure assembly 3, an arm stack assembly 5 and a magnetic driver assembly 7.

As seen in FIG. 1 the arm stack assembly 5 projects radially outwardly from an axis 30 about which an actuator member 31 rotates or is angularly moveable. Load fingers 52a of the flexure assemblies, as seen in FIGS. 1 and 2, each have one end attached to an outer extremety of each arm 51 of the arm stack assembly 5 in a position supporting its magnetic head 52 adjacent the surface of a disc 11. The actuator arm assembly is in an angular position about the axis 30, positioning the magnetic heads 52 in their outer radial positions or limits with respect to the magnetic discs. The actuator member 31 is provided with impact pads 31d and 31e which respectively impact eccentric limit stops 31f and 31g which establish the radial limits of angular freedom of the actuator member 31 and, hence, the entire actuator arm assembly.

Angular movement of the actuator arm assembly is controlled by the magnetic driver assembly 7. The magnetic driver assembly comprises a permanent magnet structure 71 having permanent magnets 73 and a moving coil assembly 74 which is secured to the actuator member 31 in a position sweeping an arcuate center pole 72 which the moving coil assembly encompasses. Current of reversible polarity in the moving coil 74 produces an electromagnetic field interacting with the permanent magnet field to drive the moving coil one direction or the reverse which moves the actuator assembly angularly between its limits of angular movement.

The actuator member 31 is in its counter clockwise position limit, in which position the impact pad 31e abutts the eccentric stop 31g. In this position the transducer heads 52 are at their outer radial limits with respect to the memory discs 11. When the impact pad 31d abutts the eccentric stop 31f which is the clockwise position limit of the actuator member 31, the transducer heads 52 are at their inner radial limits with respect to the memory discs 11. These radial position limits of the transducer heads with respect to the memory discs must be precisely set and must be precisely maintained throughout the operating life. Drift in these position limits, particularly into data areas of the disc, causes malfunctions.

Details of the eccentric stops and the impact pads are illustrated in the drawings and discussed herebelow. The relative positions of the limit stop parts, however, are evident from FIG. 1. The eccentric features of the limit stops 31f and 31g are apparent in FIGS. 1, 13 and 14. The degree of limit stop adjustment which can occur within 180 degrees of rotation is determined by the radial eccentricity. Thus, a large angular movement, between positions 180 degrees apart, of the eccentric limit stop provides a fine and precise, yet low sensitivity, adjustment of the eccentric sections of the limit stop, to achieve precise positioning of the transducer heads 52 in their respective radial limits. The limit stop is also a stiff spring. Its mass between the bearings is accelerated upon impact by the impact pads on the actuator arm assembly. The non-linear character of the applied force reduces the abrupt pickup of this mass which reduces the frequency content of the impact. Reduction of the frequency content minimizes high frequency ringing.

Figure 3:
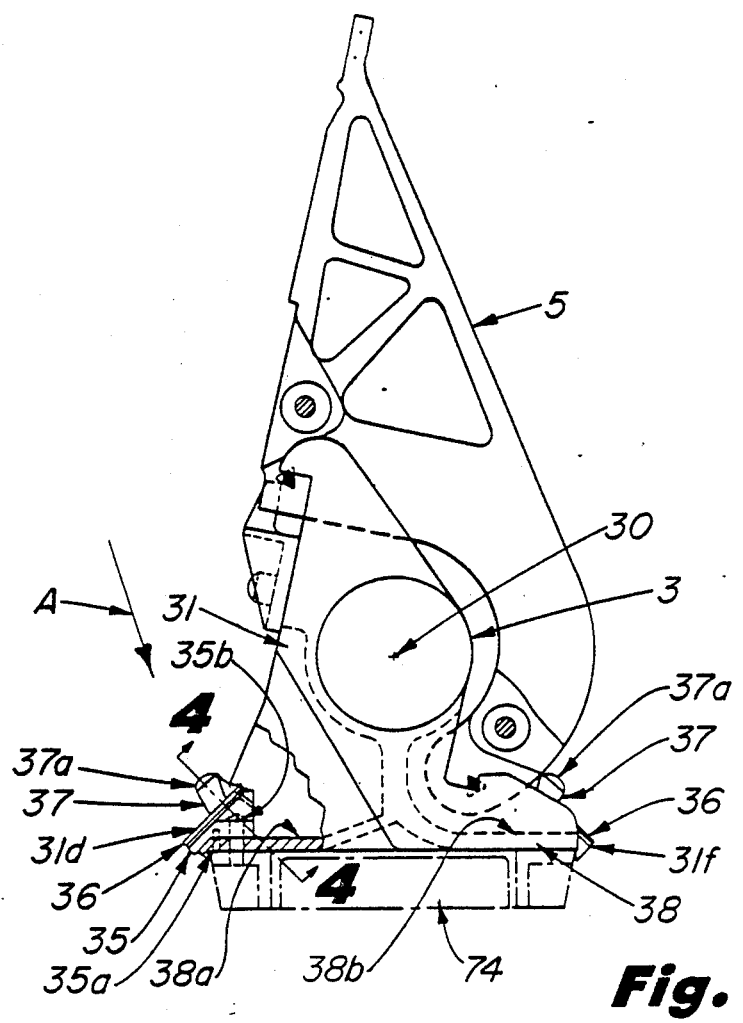
FIG. 3 is an enlarged detail of the actuator arm assembly showing the impact pads in their respective positions on this actuator arm assembly.

FIG. 3 is a slightly enlarged view illustrating the actuator arm assembly alone and detailing the installation of the impact pads 31d and 31f on the actuator member 31. FIG. 6 will also be useful in visualizing this installation. The actuator member 31 is provided with a mounting bracket section 38 on the side thereon opposite the arm stack 5, having a mounting face which receives the housing of the coil assembly 74 and having innerfaces 38a and 38b, each terminating in beveled outer surfaces for receiving impact pad supports 35, as seen in FIG. 3 and in the enlarged longitudal cross sectional view of FIG. 5. These impact pad supports 35 are each provided with spring pins 35a which are pressed into the impact pad supports and fit snuggly into holes in the bracket section 38 adjacent the beveled surfaces of the bracket, in positions to precisely index the seating surfaces of the impact pad supports against the recieving surfaces of the bracket section 38. The location hole in the support is slightly offset from the corresponding hole in the bracket 38 such that the 45° angled surface on the support is pulled flush with the corresponding surface on the bracket by the spring nature of the pin 35a. This ensures that the only gap formed is the one etween the springs (36) and the supprot (35). The offset between the pin 35a and the hole in which it fits is exaggerated in FIG. 5 for the purpose of illustration. Thereafter, screws 35b clearing through holes in flanges 35c on the impact pad supports and holes in the bracket section 38 threadedly engage flanges in the housing of the coil assembly 74, intergrating the impact pads and the coil assembly with the ac uator member 31.

Figure 5:
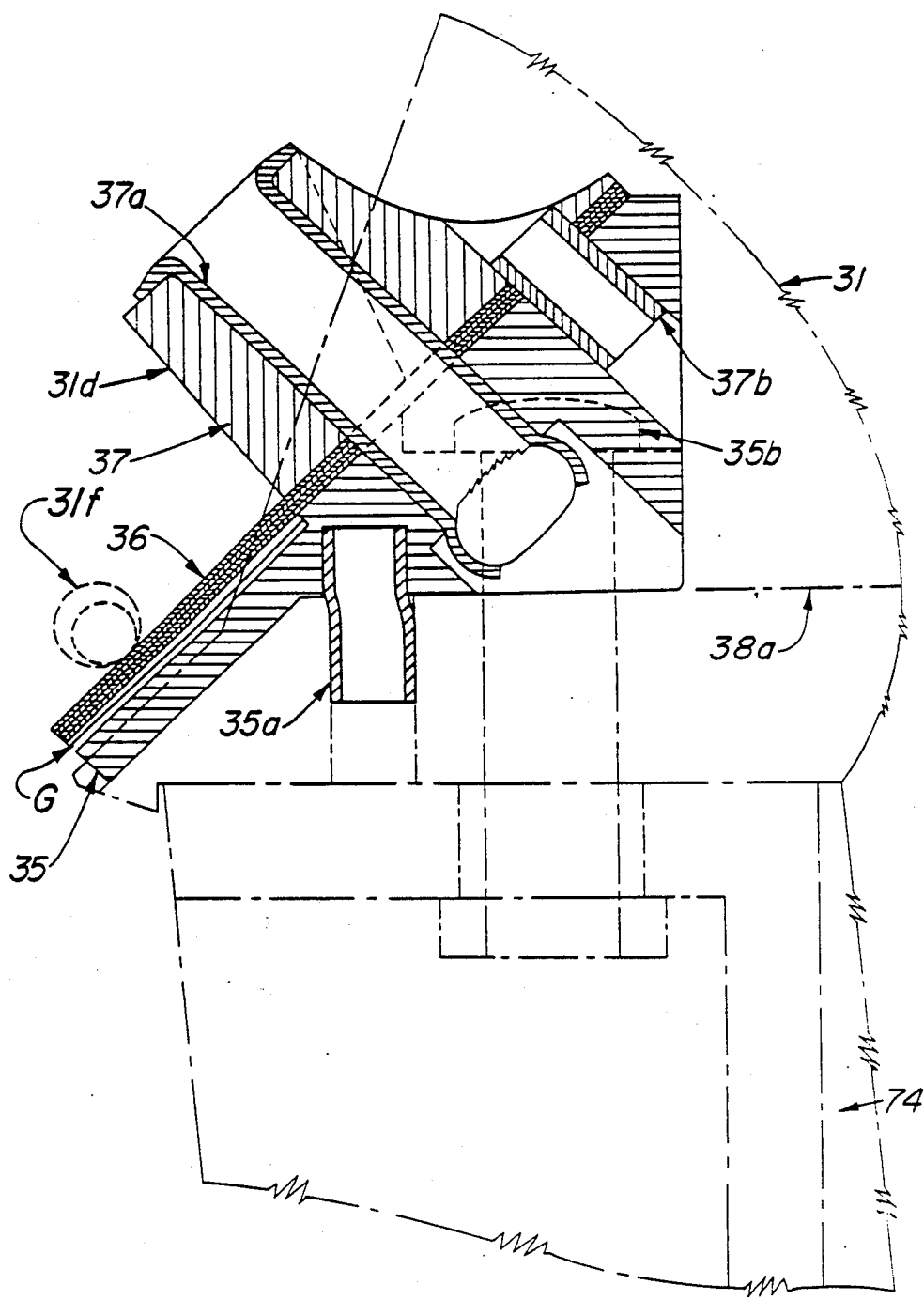
FIG. 5 is an enlarged longitudinal cross sectional view of the impact pad assembly.

A cantilever leaf spring assembly 36 comprising a plurality of leaf springs, there being four in number, as shown in FIG. 5, is clamped to an elevated surface of the pad support 35 by means of a clamp 37. This assembly is secured by means of a blind fastening rivet 37a which securely engages the clamp with the impact pad support. A spring pin 37b pressed into a hole in the clamp 37 passes through clearance holes in the leaf spring assembly 36 and snuggly engages a corresponding hole in the impact pad support 35 to precisely index the clamp 37 and cantilever leaf spring assembly 36 at the time when the rivet 37a is inserted, so that all parts of this impact pad assembly are precisely indexed at the time this blind fastening rivet is set.

Figure 4:
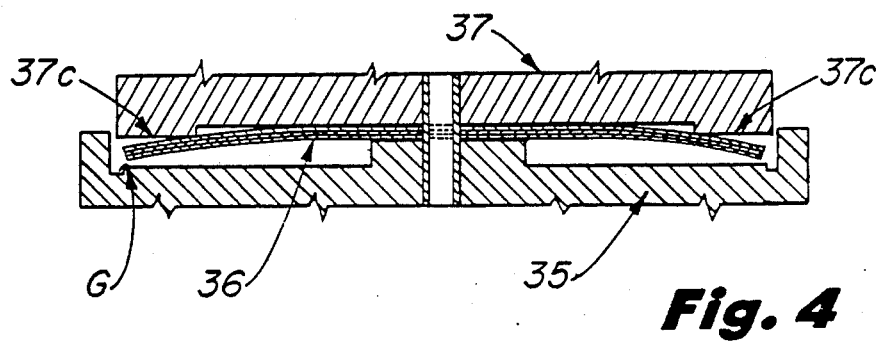
FIG. 4 is an enlarged cross sectional view taken on the section line IV—IV of FIG. 3.

As seen in the cross sectional view of FIG. 4, which is taken on the line IV—IV of FIG. 3, through the impact or crash pad assembly, the surface of the impact pad support 35 upon which the leaf springs are clamped is elevated with respect to the surfaces on each side thereof. The individual leaf springs 36 are transversely bowed and when securely clamped in position, the inner area of the cantilever leaf spring assembly clears the confronting surface of the impact pad support 35 by a predetermined small distance. The outer transverse edges just clear, or at most slightly touch the support. The establishment of a light touch to small clearance at the outer transverse edges and a precise gap G in the central area is insured by profiling the clamping face of the clamp 37 to provide raised portions 37c which engage the leaf springs 36 in transverse positions displaced outwardly from the raised central part of the impact pad support 35, precisely depressing the transverse edges of the leaf spring assembly in their bowed relationship. In this case stepped surfaces are used for simplified manufacturability. The details of the clamp 37 are best seen in the projections of FIGS. 7, 8 and 9, while the details of the impact pad support 35 will be best seen from the plan view of FIG. 10 and the cross sectional view of FIG. 11. The plan view of a cantilever leaf spring is illustrated in FIG. 12.

While the crash pad assembly is described as a separately fabricated item for ease of manufacturability, it will be apparent that the crash pad may be fabricated by shaping the surfaces 38a and 38b to accept the springs 36 and thereafter securing the springs using the clamp 37 and a fastener such as the blind rivet 37a.

The location of the eccentric stop 31f in relation to the impact pad 31d just as the leaf springs 36 engage the eccentric stop 31f is shown in FIG. 5. As angular movement of the actuator member 31 continues towards the eccentric stop 31f, the force applied to the cantilever leaf spring assembly 36 causes this leaf spring assembly to bend downwardly as viewed, progressively contacting the outer edge of the bottom spring at its or unclamped end with the confronting surface of the impact pad support 35. At this step the spring rate increases, requiring a larger force to achieve a further spring deflection. Such force flattens the cantilever spring at its extremity. At this point the spring rate again increases as the cantilever spring assembly flattens with continued movement of the actuator member towards the eccentric section of the limit stop 31f. Thereafter a reverse bend develops in the cantilever spring assembly between the outer or free end bearing upon the surface of the pad 35 and the inner end at the clamp 37.

Thus, a nonlinear spring rate is achieved which is used in lesser or greater degree depending directly upon the angular rate of travel of the actuator arm assembly at the time of impact. It will be observed that this spring deflection is damped by sliding friction forces between the engaged sliding faces of the leaves of the cantilever spring assembly. This damping force will be a function of the normal component of the applied force, the sliding coefficient of friction being relative constant.

One of the limit stops 31f is illustrated in the elevation and end views of FIGS. 13 and 14. Here a stainless steel rod or pin 39 is insert molded into a jacket 39a of an easily molded plastic or thermoplastic elastomer material. In applications in a magnetic disc memory drive it may be desirable that the magnetic permeability of the insert be less than two at 100 oersteds. This thermoplastic jacket 39a is provided with journals 39b adjacent its ends. The axis of the rod 39 is eccentric with respect to the common axis of these journals. Thus the central body section 39c, as viewed in FIG. 13, which is engaged by the impact pads provides a sturdy impact section which affords adjustability of the limits of angular movement of the actuator member. The journals 39b are journaled in upper and lower sections 32b and 32a of the actuator housing 32, as seen in FIG. 13, with their common journal axis paralleling the pivot axis 30 of the actuator member 31. This housing is further illustrated in FIGS. 1 and 2. An enlarged concentric collar 39d of the limit stop rides on the top face of the upper section 32b of this actuator housing 32 and a concentric limit stop 39e provided with edges 39f, formed by differing diameter sections of the limit stop 39e, in cooperation with the clamp 39g (FIG. 15) controls the limits of angular movement of the limit stop 31f. The clamp 39g is screwed to the top face of the upper housing section 32b of the actuator housing 32 in a position fitted about the limit stop 39e, as shown in dotted outline in FIG. 14. A tab 39h on the clamp 39g engages the edges 39f to control the limits of angular freedom of the eccentric limit stop. This is designed so that angular freedom amounts to 180 degrees which corresponds to the limits of eccentricity.

An alternative arrangement for controlling the angular freedom and for clamping the eccentric stop in any position between and including its limits of angular freedom is shown in FIG. 16. Here the top section 39c of the eccentric limit stop 31f is slotted as a concentric, semicircular slot. A screw which clears through this slot threads into the top face of the upper section 32b of the housing 32 to secure the eccentric stop in selected angular positions.

It is important that the eccentric limit stops 31f and 31g exhibit consistant stiffness under impact. Conceivably such consistant stiffness might be achieved with precise dimensional control of the diameter of the eccentric limit stop journals and the bores in the upper and lower housing sections in which they fit. Such dimensional controls present problems, both in fabrication and in assembly.

The clamps 39g provide consistent stiffness boundary conditions at the upper journal ends of the stiff spring rods 39 of the eccentric limit stops. Control of stiffness at the lower end of the rods is achieved by frictionally restraining the lower journal of the eccentric limit stop in its housing bore. The bottom section 39k is tapered and a cup 39l having correspondingly, internally tapered side walls slides into the lower journal bore and is axially spring loaded to engage the tapered surfaces. Spring loading is achieved by compressing a spring 39m between the bottom side of the cup 39l and a cup 39n pressed into the open end of the bore. The cup 39l is of a soft, self lubricated material. The spring loaded constraint which it provides wedges the bottom journal of the eccentric limit stop in the bore with sufficient force to limit radial play in the operating range, but with a low enough force to still permit rotational adjustability.

INDUSTRIAL APPLICABILITY

Computer disc memory drives or files, as they are known, are widely used in computers and digital communication systems for storing information useful in performing arithmetical operations or data processing functions. Such equipment is extremely expensive and is difficult to manufacture. Limit settings for the actuators, whether linear or rotary, must be made with precision and with certainty that the limit setting and stopping distances will be maintained. As noted hereinabove, this invention in its unique organization provides improvements with respect to the ease of setting and of maintaining the limits of movement of an actuator assembly, of minimizing stopping distance in such limits and of limiting vibration of the actuator assembly in its limits, using the unique technique of nonlinear deceleration, with some frictional damping.

I claim:
1. In a disc memory drive having a housing, a rotatable memory disc, a transducer head for deriving information from said memory disc, and a movably mounted actuator structure for supporting and bidirectionally moving said transducer head between radial limits in a transducer head path adjacent the surface of said memory disc, the improvement comprising:
   a. a pair of impact members on said movably mounted actuator structure, each impact member moving with said actuator in a predetermined impact member path;
   b. a pair of rod shaped limit stops, one for each impact member;
   c. axially spaced bearings on each rod shaped limit stop;
   d. journals in said housing journaling said bearings and supporting each rod shaped limit stop in a respective impact member path to be engaged by the respective one of said pair of impact members at a location on each rod shaped limit stop intermediate said axially spaced bearings; and
   e. a radially eccentric portion on each rod shaped limit stop at said location so that rotation of said rod shaped limit stop adjusts the limit of movement of the associated impact member in said predetermined impact member path for controlling the radial limits of movement of said transducer head in said transducer head path.

2. The invention according to claim 1, wherein:
   a. said radially eccentric portion of said rod between said axially spaced bearings is a stiff spring and bends upon impact by said impact member.

3. In a disc memory drive having rotatable memory discs; transducer heads, one for each memory disc, for deriving information from said memory discs; an actuator structure for supporting and moving said heads bidirectionally in an arcuate path radially of said memory discs, comprising:
   a. an actuator housing having spaced top and bottom sections;
   b. an actuator arm mounting said transducer heads;
   c. means pivotally mounting said actuator arm between said top and bottom sections about an axis substantially paralleling the axis of rotation of said memory discs;
   d. impact means on said actuator arm radially displaced from the axis of rotation of said actuator arm; and
   e. a pair of limit stops each comprising a rod, each rod having an upper journal and a lower journal, respectively rotatably supported by said top and bottom sections, for rotation about respective axes in corresponding radial positions on opposite sides of said actuator arm, each axis substantially paralleling the axis of rotation of said actuator arms, each rod having a radially eccentric intermediate portion between said upper journal and said lower journal for engagement by said impact means to limit the angular movement of said actuator arm.

4. The invention according to claim 3, in which:
 a. the bottom end of each rod is provided with a conical surface; and
 b. a conical, axially spring loaded cup is fitted about each conical surface and wedged into each lower journal.

5. In a disc memory drive having a housing, memory discs rotatably mounted in said housing transducer heads for deriving information from said memory discs and an actuator arm assembly movably mounted in said housing for supporting and bidirectionally moving said transducer heads between radial limits with respect to said memory discs, the improvement comprising:
 a. a pair or spaced limit stops in said housing for limiting the movement of said actuator arm;
 b. a pair of non linear spring members mounted on said actuator arm for impacting said stops, respectively, and applying a non-linear decelerating force to said actuator arm;
 c. each non-linear spring member comprising a support surface on said actuator arm;
 d. a transversely bowed cantilever spring means supported at one end on said support surface and having a free end opposite said one end spaced from said support surface, an intermediate portion of said cantilever spring means impacting the associated limit stop to limit movement of said actuator arm;
 e. said free end of said cantilever spring means after impact with said limit stop engaging said support surface, continued movement toward said stop thereafter flattening the transverse bow in said cantilever spring means against said support surface and thereafter reverse bending said cantilever spring means between said one end and said free end against said support surface.

6. The invention according to claim 5 wherein said limit stops each comprise:
 a. a rod rotatably journaled adjacent its ends in said housing and having a radially eccentric intermediate portion disposed to intercept said non-linear spring means; and
 b. means for securing said rod in selected angular positions.

* * * * *